March 10, 1942.  F. W. CALDWELL ET AL  2,276,262
COMPOSITE PROPELLER
Filed June 27, 1939  2 Sheets-Sheet 1
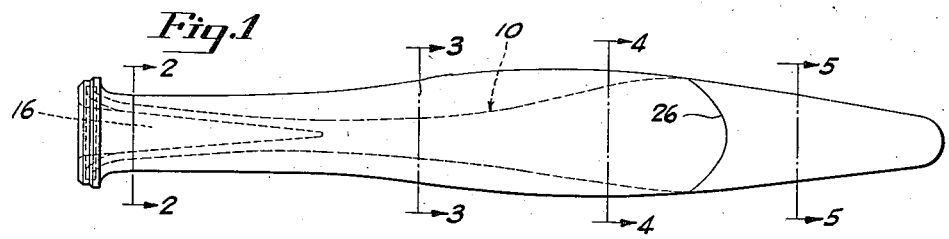
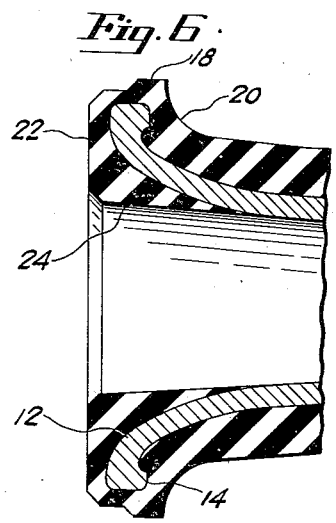
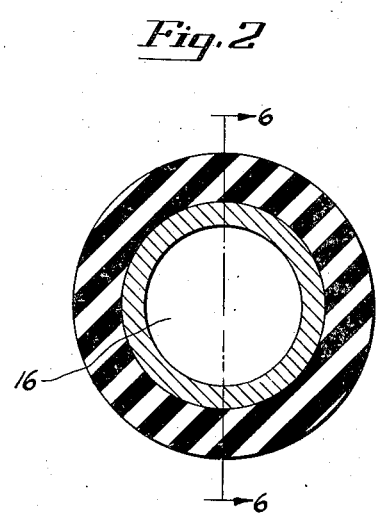
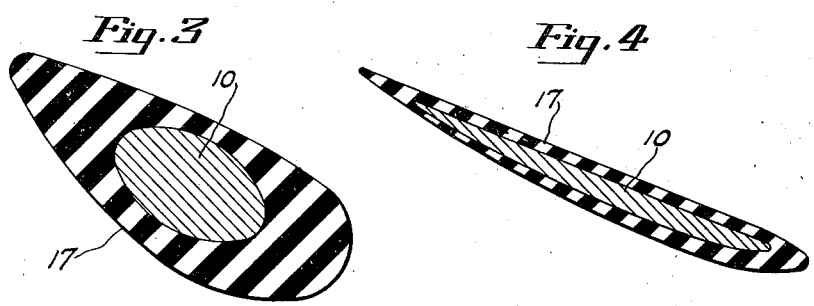
INVENTOR
Frank W. Caldwell.
Erle Martin.
BY
Harris G. Luther
ATTORNEY March 10, 1942.   F. W. CALDWELL ET AL   2,276,262
COMPOSITE PROPELLER
Filed June 27, 1939   2 Sheets-Sheet 2
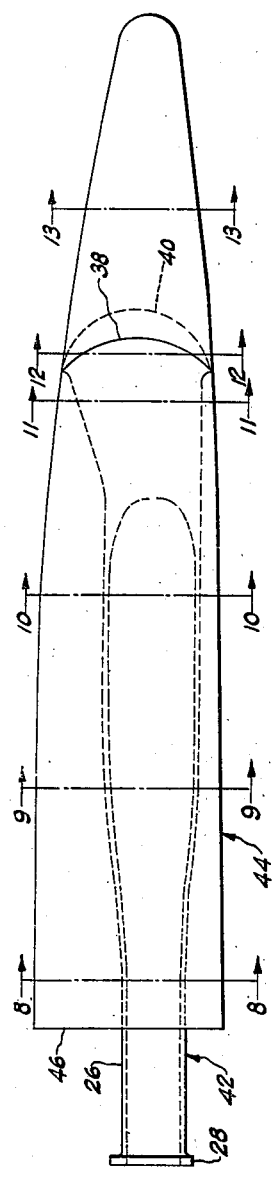
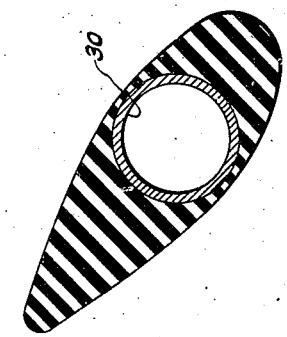
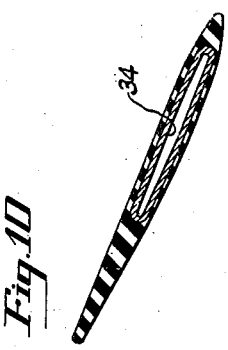
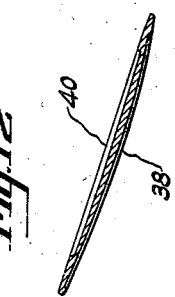
INVENTOR
Frank W. Caldwell.
Erle Martin.
BY Harris G. Luther
ATTORNEY Patented Mar. 10, 1942

2,276,262

UNITED STATES PATENT OFFICE 2,276,262

COMPOSITE PROPELLER

Frank W. Caldwell and Erle Martin, West Hartford, Conn., assignors to United Aircraft Corporation, East Hartford, Conn., a corporation of Delaware Application June 27, 1939, Serial No. 281,376

9 Claims. (Cl. 170—159)

This invention relates to improvements in propellers and has particular reference to an improved blade construction for an aeronautical propeller.

An object of the invention resides in the provision of an improved propeller blade having a material weight reduction in comparison with a conventional blade of the same size with no material reduction in the strength and rigidity of the blade.

A further object resides in the provision of a composite propeller blade having a metal core constructed to carry the stresses to which such a blade is subjected with a reasonable factor of safety and an airfoil fairing of molded material bonded to the metal core to provide the proper blade shape for aerodynamic efficiency.

A somewhat more specific object resides in the provision of an improved composite propeller bade having a metal core and a fairing of molded material bonded thereto in which a portion of the metal core constitutes the metal tip and leading edge portions of the blade and the inner portion of the core has a substantially circular cross-section to provide a core having the maximum sectional modulus for the weight of metal utilized.

Other advantages will be more particularly pointed out hereinafter or will become apparent as the description proceeds.

In the accompanying drawings in which like reference numerals are used to designate similar parts throughout, there is illustrated a suitable example of a propeller blade constructed according to the invention. The drawing, however, is for the purpose of illustration only and is not to be taken as in any way limiting or restricting the scope of the invention.

In the drawings,

Fig. 1 is an elevational view of a propeller blade constructed according to the invention.

Fig. 2 is a sectional view on an enlarged scale taken on the line 2—2 of Fig. 1.

Fig. 3 is a sectional view on an enlarged scale taken on the line 3—3 of Fig. 1.

Fig. 4 is a sectional view on an enlarged scale taken on the line 4—4 of Fig. 1.

Fig. 5 is a sectional view on the same enlarged scale taken on the line 5—5 of Fig. 1.

Fig. 6 is a longitudinal sectional view of a fragmentary portion of the propeller blade at the root or base end thereof taken on the line 6—6 of Fig. 2.

Fig. 7 is an elevational view of a somewhat modified form of propeller blade construction, and Figs. 8, 9, 10, 11, 12 and 13 are sectional views at stations 8, 9, 10, 11, 12 and 13, respectively, of Fig. 7.

Referring to the drawings in detail, the metal core, generally indicated by the numeral 10, has a flat tip portion and a hollow base portion of circular non-airfoil cross section provided at the base end with an outward flare, as indicated at 12, and an annular bead 14 to provide a reinforcing structure for the blade attaching flange. The base cavity 16 is tapered towards the tip end of the core and terminates substantially in a point at about one-fourth of the blade length or near the third station of the blade illustrated, although the shape and length of the cavity may vary with the blade design. The portion of the core 10 including the cavity 16 is in the form of a hollow cone of circular cross-section, as is particularly shown in Figs. 2 and 6. Between the conical portion, as shown in Fig. 2, and the flat tip portion, as particularly shown in Fig. 4, the core section gradually changes from the circular to the flat form, the circular form being retained insofar as possible in order to give the maximum sectional modulus to all portions of the core.

All but the tip portion of the core is covered with a fairing of a suitable moldable, originally plastic, material such as "Micarta," expanded rubber, or some other suitable commercial "plastic." This material is placed mainly upon the outside of the core and, starting with the circular sectional form near the base end of the blade, as shown in Fig. 2, is brought to the airfoil sectional form shown in Figs. 3 and 4. At the base end the coating is formed to provide the flange 18 with an annular bearing fillet 20, and an end bearing surface 22. In order to provide an adequate end bearing surface and the proper internal dimensions to receive a supporting hub spider arm, not illustrated, some of the material is molded to the inner surface of the core at the base end, as particularly illustrated at 24. This construction provides a simple and relatively light base or root end for the blade in which the bearings are supported on the non-metallic material and the metal core is centered in this material to provide adequate reinforcement for all bearing surfaces including that between the blade and the spider arm as well as the fillet 20 for the thrust bearing and the surface 22 for the shim plate bearing.

As is particularly shown in Fig. 1 the moldable material does not extend the entire length of the core but terminates short of the tip end as indicated by the line 26 so that the blade has a bare metal tip portion.

The entire core or strength member is formed of any suitable material but is preferably formed of some metal suitable for propeller blades such as an aluminum or magnesium alloy or steel of a high strength and resiliency so that a relatively small and light weight core is adequate in strength to carry all loads to which the blade is subjected with an adequate factor of safety. Forming the tip portion, which is the high speed portion of the blade as a bare metal surface protects the blade against erosion due to contact with rain drops or sleet or particles picked up from the ground during take-off, while the nonmetallic fairing provides an efficient airfoil form for the covered portion of the blade without the necessity of the additional weight incident to forming the entire blade of metal of the correct airfoil contour. At the point where the core projects out of the fairing the fairing is gradually tapered down to a feather edge to avoid any concentration of stresses in the portion of the core at which the fairing terminates. The same construction is also provided for the inside coating 24 which, as clearly shown in Fig. 6, tapers gradually to a feather edge within the core cavity.

By this means a core of very light construction consistent with the necessary strength can be brought to an efficient aerodynamic blade shape without adding materially to the weight of the core or causing a concentration of stresses at any particular location therein.

In the somewhat modified blade construction shown in Figs. 7 to 13, inclusive, the core is in the form of a relatively thin walled tubular portion which fairs into an integral flat tip portion. The core which may have either a cylindrical or elliptical shape is shown with a cylindrical shank of circular cross section as indicated at 26 upon the end of which there is integrally formed a blade retaining flange 28 adapted to be secured in a propeller blade retaining hub barrel, not illustrated, in the conventional manner. Beyond the shank the tubular portion of the core is gradually flattened from the substantially circular section shown in Fig. 8 and indicated by the numeral 30 through the ellipse or modified ellipse indicated at 32 in Fig. 9, the flat or modified ellipse indicated at 34 in Fig. 10 to the flat solid section of generally airfoil contour indicated at 36 in Fig. 11. After the core has been reduced to the flat solid section it is gradually tapered to the shape of the blade tip, an intermediate section of the tip portion being shown in Fig. 13 and indicated by the numeral 39.

The section of steel core as shown in Fig. 12 has a somewhat larger overall area than the section shown in Fig. 11 even though the section of Fig. 12 is somewhat nearer the tip than the section of Fig. 11. This is due to the fact that the portion of the steel core at which the section of Fig. 12 is taken is enlarged over the section shown in Fig. 11 to provide the curved shoulders 38 and 40 in the face of the blade for a purpose which will presently appear.

The core, generally indicated by the numeral 42, may be formed by any convenient method, one practical method being to first form a blank of circular cross-section from the root end to a point somewhat past the end of the internal cavity, leaving the blade solid beyond the cavity and reducing it to a flat section of a width somewhat greater than the width of the tip portion of the finished blade. The flange 28 may, if desired, be formed on the root end of the blade during the machining operation which provides the blank portion of circular section or may be upset on the blade during a subsequent operation. After the blank has been provided as indicated above, the blank portion of circular section is bored out in a manner to provide a substantially straight bore up to a point near the end of the cavity from which point the bore is tapered in to the end of the cavity. After the blank has been bored as indicated, the flange may be provided by upsetting the end of the blank in a forging operation if this flange has not already been provided by the machining operation referred to above. After the blank has been bored out as indicated it is subjected to a pressing operation to reduce the thickness of the hollow portion near the end of the cavity in the manner indicated in Figs. 9 and 10. After the hollow portion of the blank has been thus properly reduced in thickness, the tip portion and the portion at which the hollow portion of the blank fairs into the tip portion is machined to nearly the finished shape and dimension and is thereafter ground and polished to provide the finished tip portion. During this machining and grinding operation the portion of the blank immediately to the shank side of what is to become the uncovered tip portion of the finished blade is reduced in thickness to provide a relatively shallow transverse shoulder upon each surface of the blade, as indicated at 38 and 40 respectively, in Figs. 7 and 12.

After the core 42, which is preferably made of some strong metal having a high modulus of elasticity, such as a steel alloy, it is covered with a fairing generally indicated at 44. This fairing covers the core from the shank portion 26 to the shoulders 38 and 40 and has a generally airfoil section as particularly illustrated in Figs. 8 to 11, inclusive. This fairing may be made of a suitable light weight preferably nonmetallic material such as "Micarta" or expanded rubber. A fairing of expanded rubber cemented or vulcanized to the steel core and covered with a suitable coating to give it a durable smooth surface has been found to be advantageous for this purpose. At the tip end a fairing is shaped to just fill in the shoulders 38 and 40 and constitute a smooth continuation of the uncovered tip portion of the blade. From these shoulders it is faired smoothly toward the shank end of the blade and given the desired airfoil section at various stations along the length of the intermediate portion of the blade and is terminated abruptly at the shank end as indicated at 46 in Fig. 7. The width of the fairing at the end 46 should not in any case be materially less than the maximum width at any point along the intermediate portion of the blade which the fairing covers and in the form illustrated in Fig. 7 the width of this end is slightly greater than at any other point. This construction provides a blade which is aerodynamically efficient for almost its entire length thereby increasing the propulsive effect of the propeller by utilizing the portion of the blade adjacent to the propeller hub and also improving the airflow over the propeller driving engine to assist in cooling the engine. Fairing the inner portions of the blade in the manner indicated also materially reduces the windage resistance of the propeller by providing a streamlined or airfoil section for substantially the entire length of the propeller blades rather than having a material portion of the shank length of each blade of substantially circular cross section as is now the case in the conventional aeronautical propeller.

While two slightly different structural embodiments have been hereinabove described and illustrated in the accompanying drawings, for the purpose of disclosing the invention, it is to be understood that the invention is not limited to the particular arrangements so illustrated and described, but that such changes may be resorted to as come within the scope of the sub-joined claims.

Having now described the invention so that others skilled in the art may clearly understand the same, what it is desired to secure by Letters Patent is as follows:

1. A composite propeller blade comprising a metal core having a tubular shank portion of circular section, a flat solid tip portion, and a hollow intermediate portion of less than airfoil contour gradually fairing from said tubular shank portion into said flat tip portion, and a non-metallic fairing of airfoil contour on said core covering said intermediate portion and at least a part of said shank portion terminating in a feather edge near the beginning of said flat tip portion.

2. A composite propeller blade comprising a metal core having a tubular shank portion of substantially circular section, a flat solid tip portion, and a hollow intermediate portion gradually fairing from said shank portion into said tip portion, and a non-metallic fairing of airfoil contour on said core terminating in the portion of said core in which said intermediate portion fairs into said tip portion.

3. A composite propeller blade comprising, a metal core having a tubular shank portion of substantially circular cross-section, a flat solid tip portion, and a hollow intermediate portion gradually fairing from said tubular base portion into said flat tip portion, said tip portion terminating in transverse shoulders disposed one upon each surface of said blade at the location at which said intermediate portion fairs into said tip portion, and a non-metallic fairing of airfoil contour encasing and secured to at least a portion of said core extending shankward from said shoulders.

4. A composite propeller blade comprising, a metal core having a flat solid tip portion, a hollow base portion of circular cross-section, and an intermediate portion at least partly hollow having a sectional area less than that required for an efficient airfoil contour, and a non-metallic fairing on said intermediate portion to provide a composite cross-section of efficient airfoil contour over at least a portion of the length of said intermediate portion in which the non-metallic fairing material extends over said hollow base portion and into the interior thereof and is shaped to provide a fillet seat for a blade retaining thrust bearing and an end bearing for said blade, and a bearing surface within said hollow base portion for a blade carrying hub arm.

5. A composite propeller blade comprising, a metal core having a flat solid tip portion, a hollow base portion of circular cross-section, and an intermediate portion at least partly hollow having a sectional area less than that required for an efficient airfoil contour, and a non-metallic fairing on said intermediate portion to provide a composite cross-section of efficient airfoil contour over at least a portion of the length of said intermediate portion in which the non-metallic fairing material extends over said hollow base portion and into the interior thereof and said core member is provided at the base end thereof with a terminal reinforcing bead imbedded in said non-metallic material.

6. A composite propeller blade comprising, a metal core having a flat solid tip portion, a hollow base portion of circular cross-section, and an intermediate portion at least partly hollow having a sectional area less than that required for an efficient airfoil contour, and a non-metallic fairing on said intermediate portion to provide a composite cross-section of efficient airfoil contour over at least a portion of the length of said intermediate portion in which the non-metallic fairing material extends over said hollow base portion and into the interior thereof and is shaped to provide a fillet seat for a blade retaining thrust bearing, an end bearing for said blade, and a bearing surface within said hollow base portion for a blade carrying hub arm, and said core member is provided at the base end thereof with a terminal reinforcing bead imbedded in said non-metallic material.

7. A composite propeller blade comprising, a metal core having a flat solid tip portion, a hollow base portion of circular cross-section, and an intermediate portion at least partly hollow having a sectional area less than that required for an efficient airfoil contour, and a non-metallic fairing on said intermediate portion to provide a composite cross-section of efficient airfoil contour over at least a portion of the length of said intermediate portion in which the non-metallic fairing material extends over said hollow base portion and into the interior thereof and terminates both on the outside and inside of said bore in a tapered edge to avoid concentration of stresses in said core.

8. A composite propeller blade comprising, a metal core having a flat solid tip portion, a tubular base portion of circular cross-section, and an intermediate portion having a sectional area less than that required for an efficient airfoil contour, and a non-metallic fairing overlying said intermediate portion and shaped to provide a composite cross-sectional shape of efficient airfoil contour over the intermediate portion of the length of said blade and extending over said base portion and shaped to provide a fillet seat on said portion for a blade retaining thrust bearing.

9. A composite propeller blade comprising, a metal core having a flat solid tip portion, a tubular base portion of circular cross-section, and an intermediate portion having a sectional area less than that required for an efficient airfoil contour, and a non-metallic fairing on said intermediate portion providing a composite cross-section of efficient airfoil contour over the intermediate portion of the length of said blade, said non-metallic fairing terminating somewhat short of the shank end of said core member and shaped to provide along its entire length airfoil sections of gradually increasing width from the tip portion to the shank end of said blade.

FRANK W. CALDWELL
ERLE MARTIN.